United States Patent Office 3,579,380
Patented May 18, 1971

3,579,380
PROCESS FOR THE PRODUCTION OF XYLOSE SOLUTIONS
Hermann Friese, Hamburg, Germany, assignor to Sud-Chemie AG, Munich, Germany
No Drawing. Filed Dec. 4, 1969, Ser. No. 882,318
Int. Cl. C13k 9/00
U.S. Cl. 127—37
7 Claims

ABSTRACT OF THE DISCLOSURE

Xylose solutions free from crystallization-inhibiting substances are obtained, without any pre-treatment steps, from stone fruit shells such as of coconut, walnut and apricot, peach or plum pits by hydrolysis with aqueous mineral acids followed by separation from undissolved reaction residue and decolorizing.

DISCLOSURE OF THE INVENTION

The technical preparation of xylose solutions has gained considerable importance in recent times, since the hydrogenation product of xylose, xylitol, has proven itself as an excellent sweetener for use by diabetics, far surpassing sorbitol.

A number of processes have been known which start out from natural substances rich in pentosans, such as deciduous trees, straw, the beards of oats, corn cobs, pods of cottonseed, refuse of flax, and the like. In order to obtain a fairly good yield of crystallized xylose, it has been found necessary, however, to subject such starting materials to a pretreatment to remove the substances such as resins, dyes and slimy substances, and saponines contained therein which impede crystallization (compare German Pat. 834,079 and French Pat. 906,326), a process which has disadvantageous effects with regard to the profitability of the process on the yield of xylose.

A further disadvantage of these prior art processes resides in the fact that a considerable quantity of liquid is necessary for the hydrolysis, since particularly annual plants will swell considerably, so that 6 to 10 times the quantity in weight of liquid is required, related to the natural substances used which are rich in pentosan.

In addition, it is difficult to remove the sugar solution to any quantitative extent from the hydrolysis residue except by repeated washing and considerable pressing.

Furthermore, the residue from the hydrolysis, which makes up 55 to 70% of the natural substances used, contains very much bound water. This residue from the hydrolysis therefore has not been used industrially hitherto, unless hydrolysis of this residue with a strong acid has been effected until it becomes glucose, whereby again lignin will be obtained in a difficulty useable form.

It has also been known for a long time that the shells of stone fruits contain pentosan and that one can make xylose from it (compare A. Tollens, Annals of Chemistry, vol. 286, 1895, p. 306); this process likewise is carried out with the use of a pre-treatment of the material with diluted hydrochloric acid, diluted ammonia, and extraction with alcohol. The hydrolysis takes place with 10 times the quantity of 4% sulfuric acid, the yield of xylose amounting only to about 7%. This process therefore has gained no industrial significance.

It has now been found, according to this invention, that a pre-treatment of stone fruit shells is not necessary and that by the use of a relatively small quantity of aqueous acid, much smaller than that of the prior art, and while employing atmospheric pressure and boiling temperature or employing pressure above atmospheric, hydrolysis of stone fruit shells can be carried out to form xylose solutions which, through crystallization, give xylose in yields of 15 to 17% based on the material subjected to hydrolysis.

The process according to the invention is characterized by several advantages. Thus, a pre-treatment is eliminated. Furthermore, the quantity of liquids that has to be processed in the hydrolysis step is considerably smaller. Besides, less acid is required than in the case of the known processes. The xylose solution obtained after separation of the solid substances is decolorized immediately by treatment with active carbon, which is hardly the case in the known processes. The decolorized xylose solution is practically free of substances impeding crystallization and can be hydrogenated to xylitol directly in a known manner after the neutralization of the acid, for example, by use of ion exchange resins. In case the xylose solution is to be concentrated, for example, for the crystallization of the xylose, then the solution obtained in the process according to the invention has the advantage that its volume is considerably less than that of the solutions of known processes. The separation of the solid substances from the xylose solution after hydrolysis is very simple, since the solid substances retain practically no reaction solution. The separated residue can therefore be used in the plastic industry just as well as the stone fruit shells now used, in contrast to the residues of the known processes. Therefore, practically no unusable waste (residue) will be obtained in the process according to the invention.

As stone fruit shells, one can use, for example, those of coconut, walnut, hazel nut, Brazil nut, cherry, apricot, peach or plum in a crushed form, for example, as meal or as a coarse meal. The meal from the coconut shells is used preferably.

Sulfuric acid is preferred as the acid and the preferred quantity of aqueous acid per part by weight of stone fruit shells amounts to 2.5 to 3.0 parts by weight. If one operates at an atmospheric pressure, then preferably 2 to 3% by weight aqueous hydrochloric acid, 3 to 4% by weight aqueous sulfuric acid or 1.5 to 3% by weight of aqueous hydrogen bromide are used.

If, on the other hand, one works with an excess pressure, i.e. above atmospheric then the acid concentration preferably amounts to 0.5 to 1.0% by weight. The preferred pressure range when working with an excess pressure amounts to 2 to 4 atm. gauge and the preferred temperature range 110 to 135° C. more preferably 125 to 130° C. In the case of excess pressure one will heat preferably for 95 to 125 minutes.

The removal of the acid from the xylose solution after hydrolysis and sepration of the residue generally speaking up to a pH value of 3, can be accomplished in the customary manner by means of ion exchange resins, in the case of sulfuric acid as a hydrolyzer acid also by means of barium carbonate or calcium carbonate.

From the xylose solutions produced in accordance with the invention, xylose can be crystallized out by concentration especially under decreased pressure. The yield of xylose amounts to 15 to 17%, whereas according to the known processes one obtains at the most 12%, related to the pentosan-rich material used. If one wishes to use the xylose solution, produced according to the invention, directly for the production of xylitol, then the solution after decolorizing and neutralization of the acid is boiled down to a solid substance content of about 40% and is then hydrogenated under the usual conditions, for example, with Raney nickel as a catalyst.

EXAMPLE 1

2.5 liters of about 4% sulfuric acid are preheated in an oil bath to 100° C., 1000 g. of coconut shell meal are added and heated for 2 hours under reflux. The insoluble residue is removed by suction filtration and is washed with a little water. The filtrate is neutralized with calcium carbonate up to a pH value of 3. The residue of coconut shell meal after drying amounts to about 735 g. and can be used directly in the plastic industry.

The neutralized aqueous solution is decolorized with active carbon. If this solution is evaporated down at a reduced pressure at 40 to 45° C. into a light syrup, mixed with the same volume of methanol, sucked off from the separated solid substance and evaporated down in the vacuum, then the remaining syrup will soon solidify by crystallization; it has a weight of about 240 g. and contains approximately 85% xylose. Through simple recrystallization one first of all obtains 140 g. of pure xylose and from the mother liquor still further portions can easily be isolated. If one operates as described previously, but with 2% sulfuric acid, then one obtains a residue of about 760 g. and about 200 g. of raw sugar (xylose content 72%). Through recrystallization one obtains about 140 g. of pure xylose.

If one operates as described previously, but with a 6% aqueous sulfuric solution, then one obtains a residue of about 705 g., a raw sugar product of about 265 g. (75% xylose) from which one obtains about 155 g. of pure xylose.

EXAMPLE 2

1000 g. of coconut shell meal are heated under vigorous reflux for 2 hours with 2.5 liters of hydrolyzing liquid, which contains 1.2% by weight of hydrogen chloride and 0.3% by weight of hydrogen bromide. After drawing it off by suction and after washing with water, there remains a residue of 670 g. The acid solution is de-ionized with ion exchange resins and is decolorized with active carbon. After evaporating out in the vacuum at a temperature up to 45° C., there remains a syrup which quickly crystallizes and has a weight of about 295 g. From it one obtains through one time recrystallization approximately 160 g. of pure xylose.

EXAMPLE 3

1000 g. of coconut shell meal are hydrolyzed in the autoclave at about 2.5 atmospheres gauge with 3 liters of 0.5% sulfuric acid for approximately 100 minutes at 125 to 130° C. The processing takes place in the manner described in Example 1. From the syrup obtained one gets 18% of pure xylose, based on the coconut shell meal used.

EXAMPLE 4

1000 g. of apricot shell meal is hydrolyzed with 2.5 liters of 0.9% sulfuric acid in the autoclave for 120 minutes at 120–125° C., and then filtered from the residue, which is washed with a little water, and then the filtrate is neutralized with $CaCO_3$ up to a pH value of 3, decolorized with active carbon and evaporated in a rotary evaporator under reduced pressure to a weight of about 330 to 360 g. After standing the solution solidifies to a solid crystal cake; through recrystallization with 85% methanol or with isopropanol, the xylose can be obtained in a substantially pure form, the yield of a pure product amounting up to 18.5%.

I claim:

1. Process for the production of substantially pure aqueous xylose solutions by the hydrolysis of chemically untreated crushed stone fruit shells with dilute mineral acid which comprises treating, at temperatures of 100–135° C. and a pressure of atmospheric pressure up to 4 atmospheres gauge, one part of said stone fruit shells with 2.5 to 4 parts by weight of an aqueous acid, selected from the group consisting of hydrochloric, hydrobromic and sulfuric acid, having a total acid content of 0.3 to 6% by weight of acid, the total content of acid being 1.5 to 6% by weight when using atmospheric pressure, and separating the undissolved reaction residue and decolorizing and neutralizing the resultant liquid.

2. Process according to claim 1, characterized in that 2.5 to 3 parts by weight aqueous acid per part by weight of stone fruit shells is used.

3. Process according to claim 1, characterized in that 2.5 to 3 parts by weight of aqueous acid per part by weight of coconut shell meal is used.

4. Process according to claim 1, characterized in that in the case pressure above atmospheric is used, heating is accomplished at 110 to 135° C.

5. Process according to claim 1, characterized in that in the case of use of excess pressure, 0.5 to 1.0% by weight aqueous acid is used.

6. Process according to claim 1, characterized in that operation is at a pressure of 2 to 4 atmospheres gauge.

7. Process according to claim 1, characterized in that operating under standard pressure, there is used a 2 to 3% by weight aqueous hydrochloric acid, 1.5 to 3% by weight aqueous hydrobromic acid or a 3 to 4% by weight sulfuric acid.

References Cited

UNITED STATES PATENTS

| | | | |
|---|---|---|---|
| 2,086,701 | 7/1937 | Dreyfus | 127—37 |
| 2,951,775 | 9/1960 | Apel | 127—37 |
| 2,989,569 | 6/1961 | Apel | 127—37X |
| 3,067,065 | 12/1962 | Kusama | 127—37 |

MORRIS O. WOLK, Primary Examiner

S. MARANTZ, Assistant Examiner

U.S. Cl. X.R.

260—635